US012050135B2

(12) United States Patent
Aiba et al.

(10) Patent No.: US 12,050,135 B2
(45) Date of Patent: Jul. 30, 2024

(54) TEMPERATURE-DETECTING DEVICE, AND AIR-CONDITIONING-APPARATUS INDOOR UNIT INCLUDING THE TEMPERATURE-DETECTING DEVICE

(71) Applicant: Mitsubishi Electric Corporation, Tokyo (JP)

(72) Inventors: Yuta Aiba, Tokyo (JP); Tatsuo Furuta, Tokyo (JP); Naoya Matsunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 250 days.

(21) Appl. No.: 17/794,513

(22) PCT Filed: Mar. 24, 2020

(86) PCT No.: PCT/JP2020/013011
§ 371 (c)(1),
(2) Date: Jul. 21, 2022

(87) PCT Pub. No.: WO2021/192033
PCT Pub. Date: Sep. 30, 2021

(65) Prior Publication Data
US 2023/0046527 A1    Feb. 16, 2023

(51) Int. Cl.
*G01J 5/04*    (2006.01)
*F24F 11/89*    (2018.01)
*F24F 110/10*    (2018.01)

(52) U.S. Cl.
CPC ............... *G01J 5/047* (2013.01); *F24F 11/89* (2018.01); *F24F 2110/10* (2018.01)

(58) Field of Classification Search
CPC ......... G01J 5/047; F24F 11/89; F24F 2110/10
(Continued)

(56) References Cited

U.S. PATENT DOCUMENTS

| 8,874,315 B2* | 10/2014 | Kariatsumari | ......... B62D 5/046 |
| | | | 180/443 |
| 2023/0046527 A1* | 2/2023 | Aiba | ....................... G01J 5/047 |

FOREIGN PATENT DOCUMENTS

| JP | H08-128704 A | 5/1996 |
| JP | 2005-017150 A | 1/2005 |
| JP | 2017-044439 A | 3/2017 |

OTHER PUBLICATIONS

International Search Report of the International Searching Authority mailed Jun. 30, 2020 for the corresponding International application No. PCT/JP2020/013011 (and English translation).

* cited by examiner

*Primary Examiner* — Raheena R Malik
(74) *Attorney, Agent, or Firm* — Posz Law Group, PLC

(57) ABSTRACT

A temperature-detecting device includes a frame, a temperature-detecting unit, a driving unit, a rotation-controlling unit, and a controller. The temperature-detecting unit includes a sensor, a sensor cap, and a sensor case. The rotation-controlling unit is configured to stop rotation of the sensor cap when the temperature-detecting unit reaches a target angle that is over 360 degrees from a reference position, with the sensor case being kept rotated by the driving unit such that the sensor is displaced from an opening and is covered by the sensor case. The controller is configured to correct a temperature detected while the sensor is exposed at the opening, with reference to a temperature detected while the sensor is covered by the sensor case.

6 Claims, 16 Drawing Sheets

(58) Field of Classification Search
USPC .................................................. 165/11.1
See application file for complete search history.

TEMPERATURE-DETECTING DEVICE, AND AIR-CONDITIONING-APPARATUS INDOOR UNIT INCLUDING THE TEMPERATURE-DETECTING DEVICE

CROSS REFERENCE TO RELATED APPLICATION

This application is a U.S. national stage application of PCT/JP2020/013011 filed on Mar. 24, 2020, the contents of which are incorporated herein by reference.

TECHNICAL FIELD

The present disclosure relates to a temperature-detecting device including a rotatable temperature-detecting unit and to an air-conditioning-apparatus indoor unit including the temperature-detecting device.

BACKGROUND ART

Examples of known indoor units for air-conditioning apparatuses include ceiling-concealed indoor units. Such an indoor unit is provided with a temperature-detecting device including an infrared-light sensor configured to detect the amount of infrared light radiated from objects such as human bodies, walls, and floors. To further increase comfort for users, the indoor unit for an air-conditioning apparatus may employ a temperature-detecting device including an infrared-light sensor of high resolution and high sensitivity. However, an infrared-light sensor of high resolution and high sensitivity may generate heat by itself. Such heat may lower the accuracy in temperature detection. Another method may be employed in which the temperature of the conditioned space is corrected with reference to the temperature of the heat generated by the sensor itself.

For example, an air-conditioning apparatus is disclosed by Patent Literature 1 that includes an infrared-light sensor, a sheet that covers the front side of the infrared-light sensor, a temperature-correction measuring unit provided in the vicinity of the sheet, and a controller configured to calculate the output from the infrared-light sensor. The infrared-light sensor is rotatable to a position where the temperature of the temperature-correction measuring unit is detectable. The air-conditioning apparatus disclosed by Patent Literature 1 has an appearance improved with the sheet covering the infrared-light sensor. Instead, the accuracy in the detection of temperature of the air-conditioned space is lowered because the infrared-light sensor that is covered by the sheet detects the temperature of the sheet itself. Therefore, the temperature detected through the sheet by the infrared-light sensor is corrected by the controller with reference to the temperature of the temperature-correction measuring unit that is detected by the infrared-light sensor.

CITATION LIST

Patent Literature

Patent Literature 1: Japanese Unexamined Patent Application Publication No. 2017-44439

SUMMARY OF INVENTION

Technical Problem

In the air-conditioning apparatus disclosed by Patent Literature 1, the temperature-correction measuring unit is provided in the vicinity of the sheet in an area within which the infrared-light sensor is rotatable. Therefore, the infrared-light sensor of the above air-conditioning apparatus is not rotatable by 360 degrees in detecting the temperature of the conditioned space. That is, the above air-conditioning apparatus is not applicable to a configuration, such as a ceiling-concealed indoor unit, employing a sensor configured to detect the temperature of objects such as human bodies, walls, and floors while rotating by 360 degrees.

The present disclosure is to solve the above problems and provides a temperature-detecting device configured to detect the temperature of a conditioned space while rotating a sensor by 360 degrees and to achieve temperature detection with increased accuracy even with an infrared-light sensor of high resolution and high sensitivity, and also provides an air-conditioning-apparatus indoor unit including the temperature-detecting device.

Solution to Problem

A temperature-detecting device according to an embodiment of the present disclosure includes a frame serving as an outer shell, a temperature-detecting unit held inside the frame such that the temperature-detecting unit is rotatable, a driving unit configured to drive the temperature-detecting unit to rotate, a rotation-controlling unit configured to control rotation of the temperature-detecting unit, and a controller configured to correct temperature detected by the temperature-detecting unit. The temperature-detecting unit includes a sensor configured to detect temperature, a sensor cap in which the sensor is held, and a sensor case having an opening and by which the sensor cap is held such that the sensor cap is rotatable, the opening allowing the sensor to be exposed to an outside. The rotation-controlling unit is configured to allow the sensor cap to rotate synchronously with the sensor case within a range of 360-degree rotation of the temperature-detecting unit from a reference position, with the sensor being exposed at the opening of the sensor case, and to stop rotation of the sensor cap when the temperature-detecting unit reaches a target angle that is over 360 degrees from the reference position, with the sensor case being kept rotated by the driving unit such that the sensor is displaced from the opening and is covered by the sensor case. The controller is configured to correct a temperature detected while the sensor is exposed at the opening, the temperature being corrected with reference to a temperature detected while the sensor is covered by the sensor case.

An air-conditioning-apparatus indoor unit according to another embodiment of the present disclosure includes a housing serving as an outer shell, a fan housed in the housing and configured to suction air from an air-conditioned space into the housing through an air inlet and to discharge the air through an air outlet, a heat exchanger housed in the housing and configured to cause refrigerant flowing inside the heat exchanger and the air suctioned into the housing to exchange heat with each other, and the above temperature-detecting device.

Advantageous Effects of Invention

In the temperature-detecting device according to an embodiment of the present disclosure and the air-conditioning-apparatus indoor unit including the temperature-detecting device according to another embodiment of the present disclosure, the sensor cap and the sensor case are allowed to rotate synchronously with each other within the range of 360-degree rotation of the temperature-detecting unit from the reference position with the sensor being exposed at the opening of the sensor case. Therefore, the temperature-detecting device and the air-conditioning-apparatus indoor unit are configured to detect the temperature of the conditioned space while rotating the sensor by 360 degrees. Furthermore, when the temperature-detecting unit reaches the target angle that is over 360 degrees, the rotation of the sensor cap is stopped, whereas the sensor case is kept rotating. Therefore, the sensor is displaced from the opening. Consequently, the sensor is covered by the sensor case. The controller is configured to correct the temperature detected while the sensor is exposed at the opening, with reference to the temperature of the heat generated by the sensor itself and detected while the sensor is covered by the sensor case. Therefore, the temperature-detecting device and the air-conditioning-apparatus indoor unit including the temperature-detecting device achieve temperature detection with increased accuracy without being affected by the temperature of the heat generated by the sensor itself.

DESCRIPTION OF EMBODIMENTS

Figure 1:
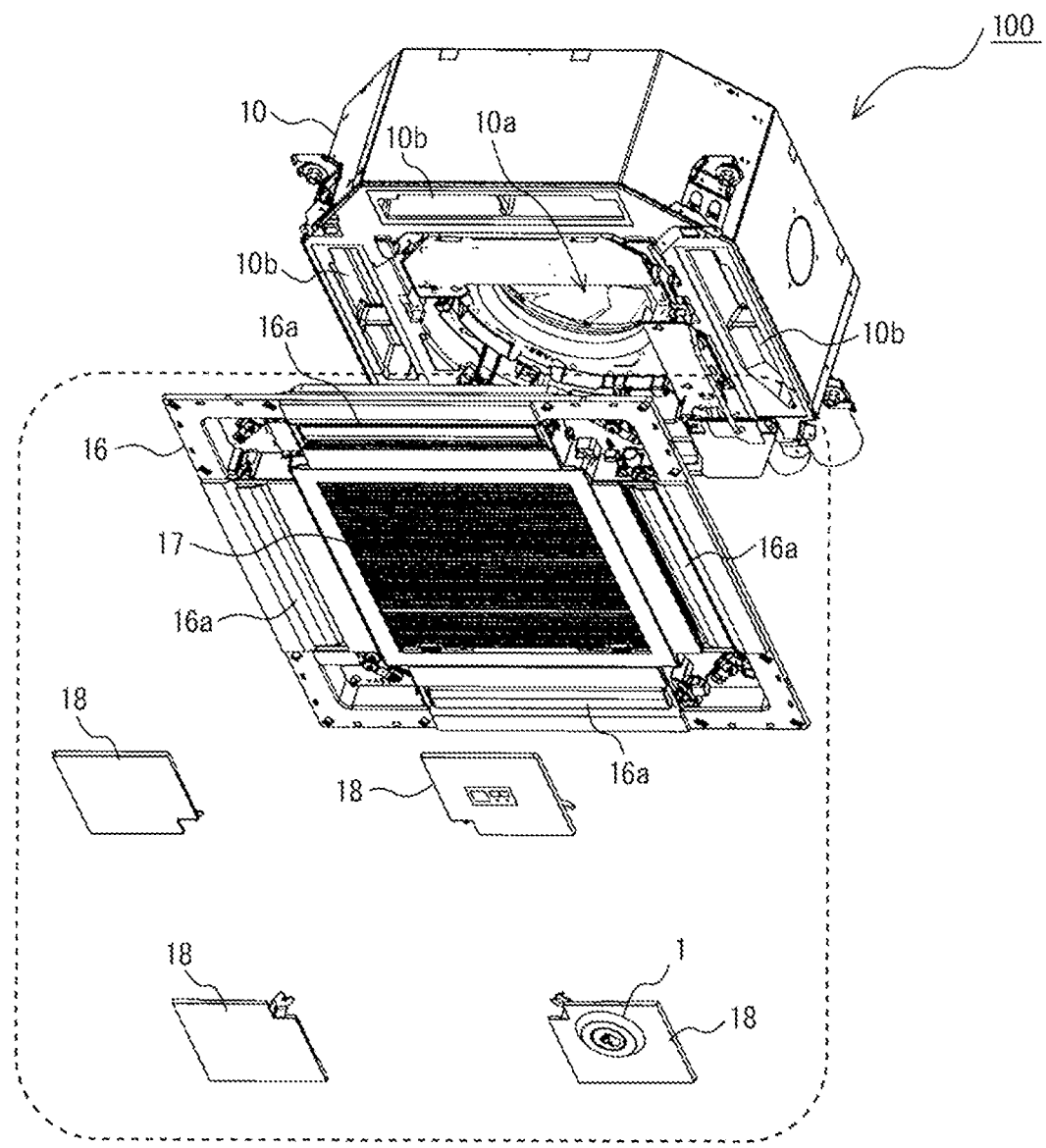
FIG. 1 is a perspective view of an air-conditioning-apparatus indoor unit according to Embodiment in a detached state.

Embodiments of the present disclosure will be described below with reference to the drawings. In the drawings, the same or equivalent elements are denoted by the same reference signs and redundant description of such elements is properly omitted or simplified. The shapes, the sizes, the arrangement, and other factors of the elements illustrated in the drawings may be properly changed.

Embodiment

Figure 2:
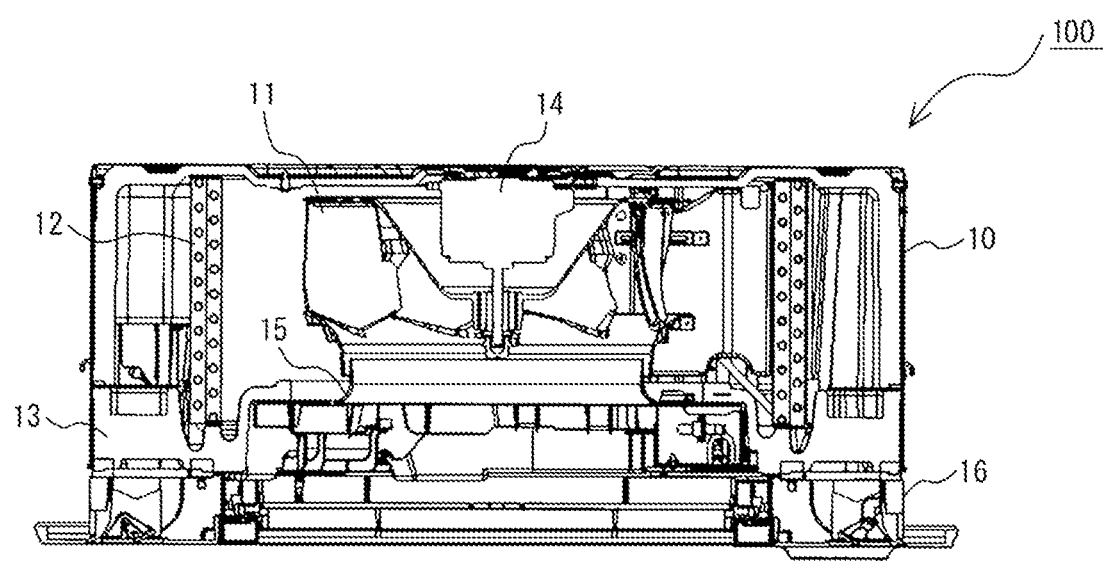
FIG. 2 illustrates an internal configuration of the air-conditioning-apparatus indoor unit according to Embodiment.

FIG. 1 is a perspective view of an air-conditioning-apparatus indoor unit according to Embodiment in a detached state. FIG. 2 illustrates an internal configuration of the air-conditioning-apparatus indoor unit according to Embodiment.

An air-conditioning-apparatus indoor unit 100 according to Embodiment is connected to an outdoor unit by a refrigerant pipe and cooperates with the outdoor unit to form an air-conditioning apparatus in which refrigerant is caused to circulate through a refrigerant circuit to perform refrigeration or any other air-conditioning operation. The air-conditioning-apparatus indoor unit 100 according to Embodiment is a ceiling-concealed indoor unit and is hereinafter described as an exemplary four-way cassette indoor unit.

As illustrated in FIGS. 1 and 2, the air-conditioning-apparatus indoor unit 100 according to Embodiment has a housing 10. The housing 10 forms the outer shell and houses, for example, an indoor fan 11, an indoor heat exchanger 12, a drain pan 13, a fan-driving motor 14, a bell mouth 15, and other relevant elements.

The housing 10 has a substantially cubic box shape and is installed in an opening provided in the ceiling of a conditioned room. The lower face of the housing 10 has a rectangular first opening 10a and four second openings 10b. The first opening 10a is provided in a central part of the lower face. The second openings 10b are provided along the respective sides of the first opening 10a.

To the lower face of the housing 10, a decorative panel 16, which covers the housing 10, is attached. The decorative panel 16 is a rectangular plate and has, in its central part, an air inlet for suctioning air in the conditioned room. The air inlet is formed to face the first opening 10a of the housing 10 and is covered by an inlet grille 17. The decorative panel 16 further has oblong rectangular air outlets 16a, through which air having passed through the indoor heat exchanger 12 is blown out into the room. The air outlets 16a are arranged around the air inlet and extend along the respective sides of the decorative panel 16. The air outlets 16a are formed to face the respective second openings 10b of the housing 10 and are each provided with a wind-direction-adjusting vane.

The decorative panel 16 is provided, at its respective corners, with detachable covers 18. The covers 18 are provided for attaching and detaching the decorative panel 16 or adjusting the decorative panel 16. One of the four covers 18 is provided with a temperature-detecting device 1, which is configured to detect the temperature of objects such as human bodies, walls, and floors.

Figure 3:
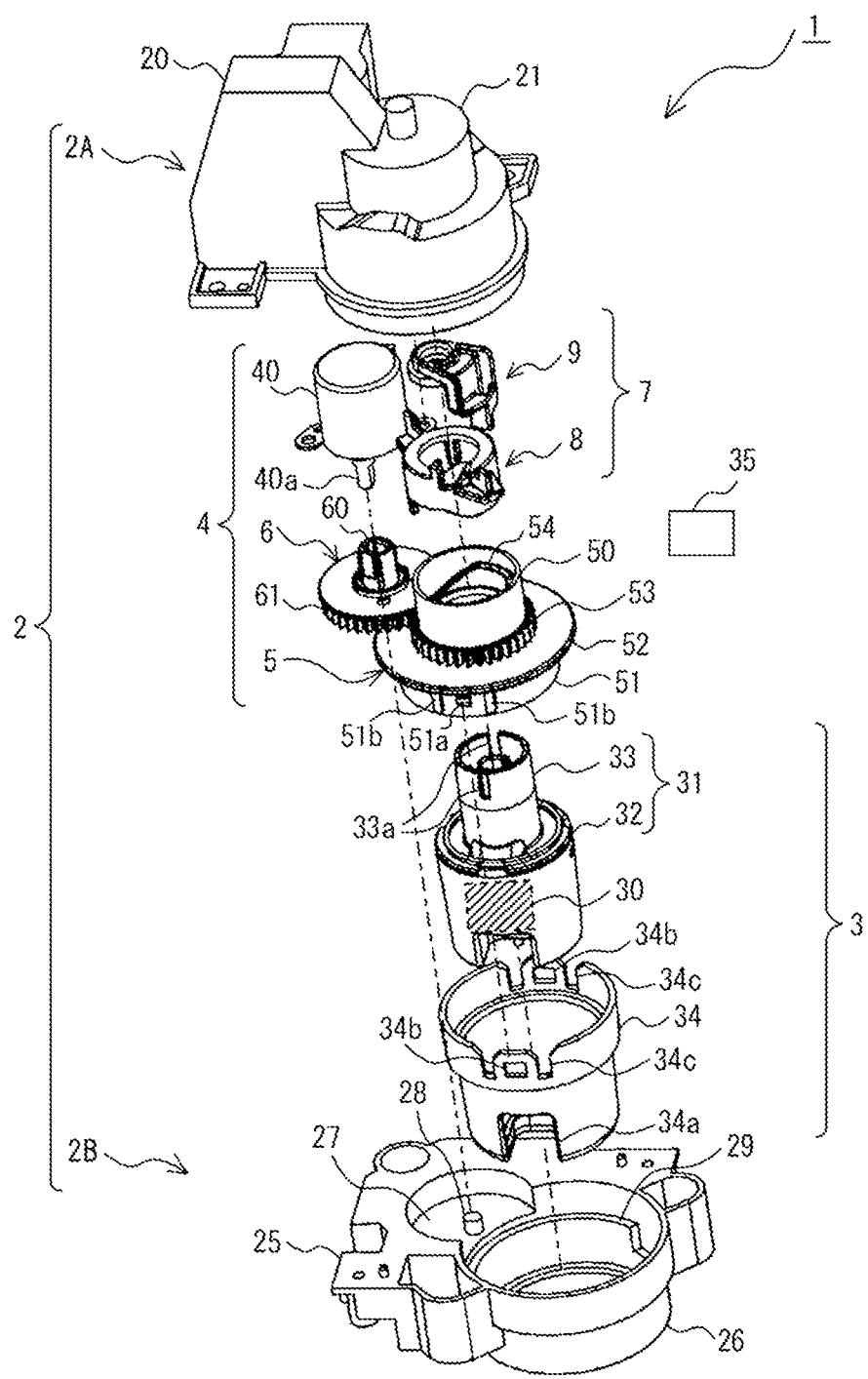
FIG. 3 is an exploded perspective view of a temperature-detecting device according to Embodiment.
Figure 4:
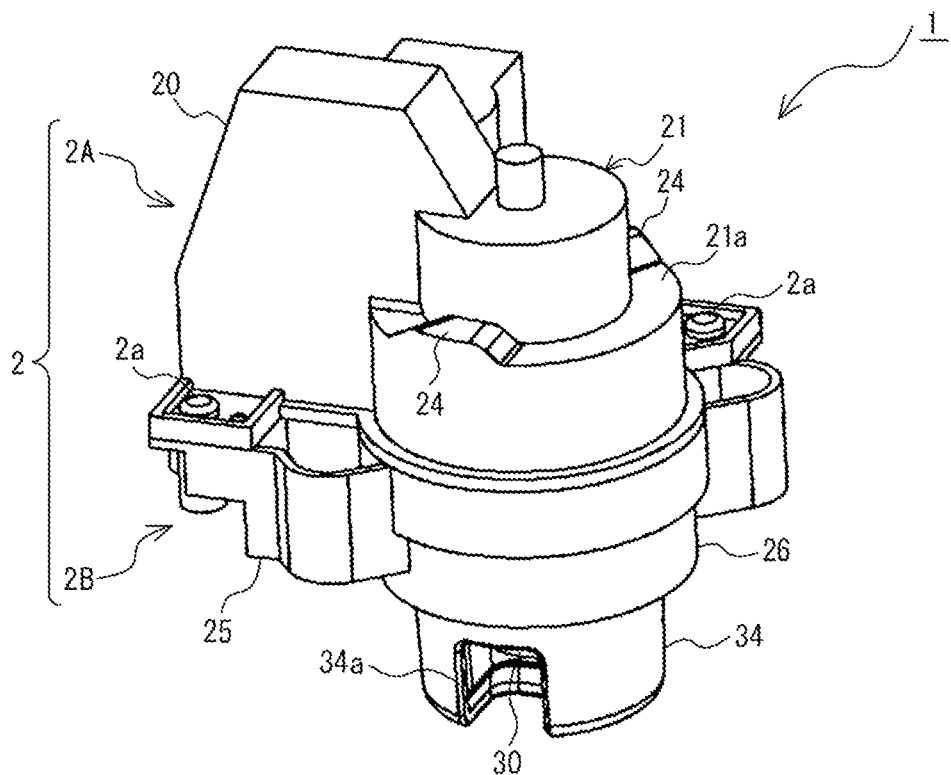
FIG. 4 is a perspective view of the temperature-detecting device according to Embodiment in an assembled state.
Figure 5:
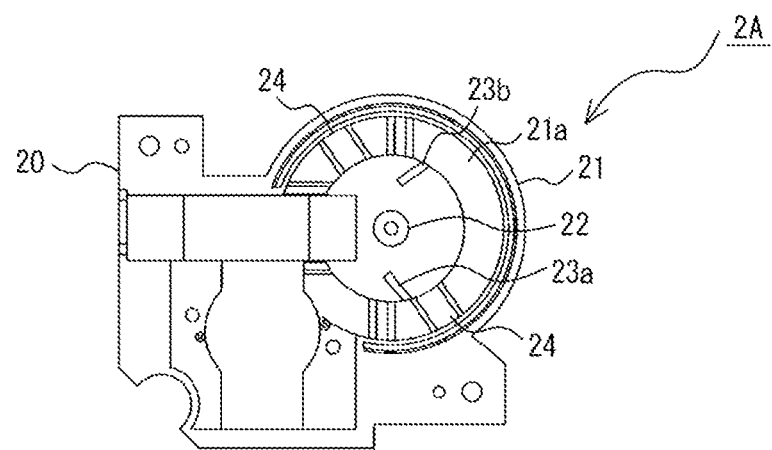
FIG. 5 is a bottom view of an upper frame included in the temperature-detecting device according to Embodiment.
Figure 6:
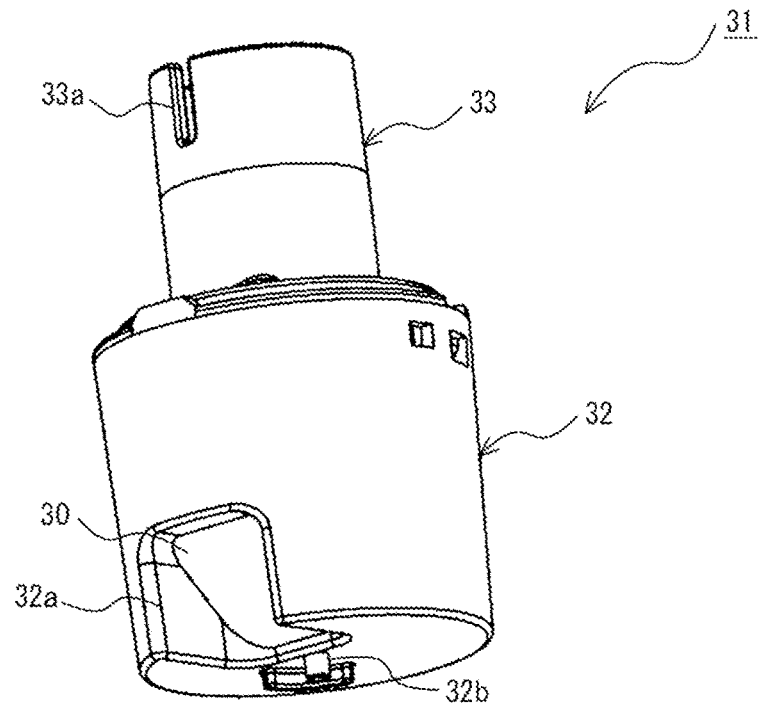
FIG. 6 is a perspective view of a sensor cap included in the temperature-detecting device according to Embodiment.
Figure 7:
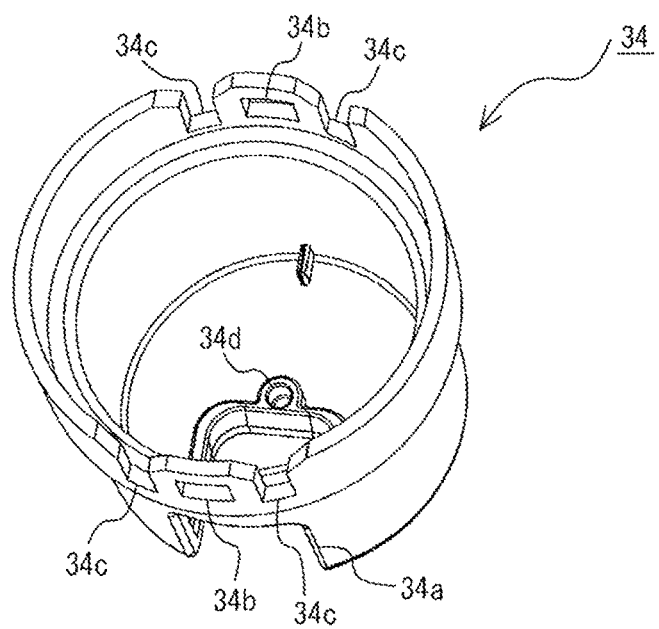
FIG. 7 is an upper perspective view of a sensor case included in the temperature-detecting device according to Embodiment.
Figure 8:
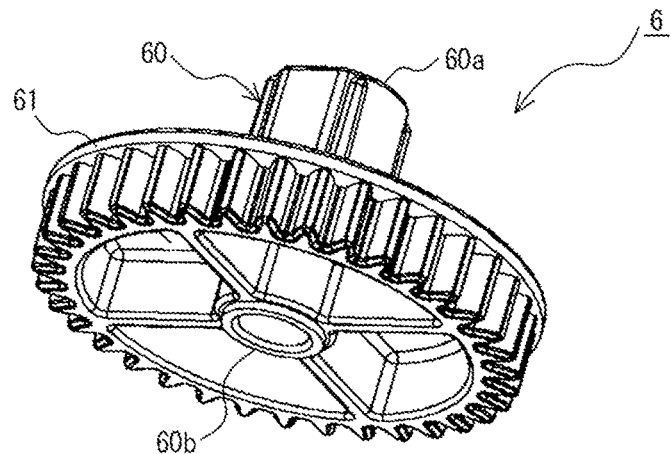
FIG. 8 is a perspective view of a driving gear included in the temperature-detecting device according to Embodiment.
Figure 9:
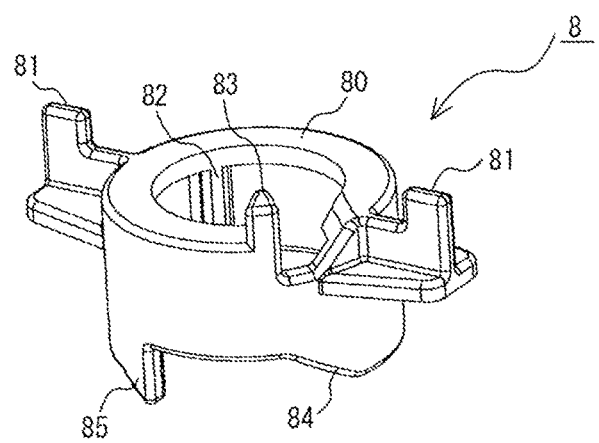
FIG. 9 is a perspective view of a liftable ring included in the temperature-detecting device according to Embodiment.
Figure 10:
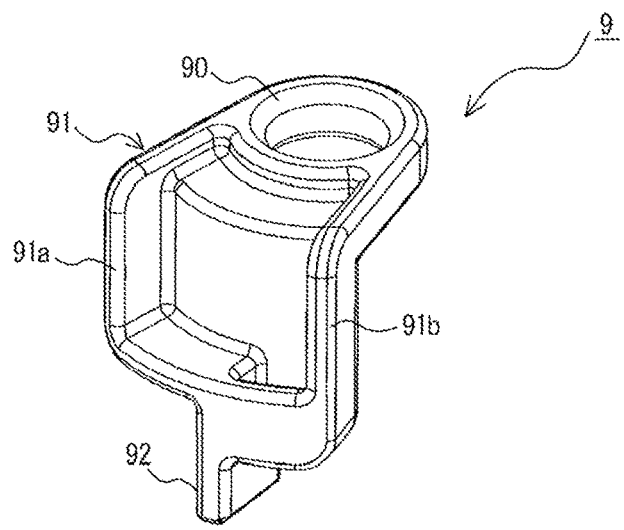
FIG. 10 is a perspective view of a rotary key included in the temperature-detecting device according to Embodiment.
Figure 11:
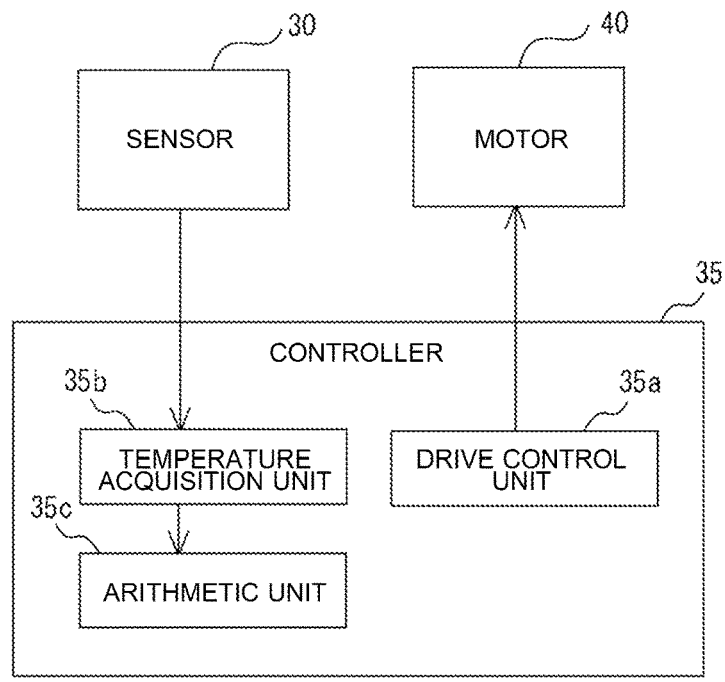
FIG. 11 is a block diagram of a controller included in the temperature-detecting device according to Embodiment.

A configuration of the temperature-detecting device 1 will be described below in detail with reference to FIGS. 3 to 11. FIG. 3 is an exploded perspective view of the temperature-detecting device according to Embodiment. FIG. 4 is a perspective view of the temperature-detecting device according to Embodiment in an assembled state. FIG. 5 is a bottom view of an upper frame included in the temperature-detecting device according to Embodiment. FIG. 6 is a perspective view of a sensor cap included in the temperature-detecting device according to Embodiment. FIG. 7 is an upper perspective view of a sensor case included in the temperature-detecting device according to Embodiment. FIG. 8 is a perspective view of a driving gear included in the temperature-detecting device according to Embodiment. FIG. 9 is a perspective view of a liftable ring included in the temperature-detecting device according to Embodiment. FIG. 10 is a perspective view of a rotary key included in the temperature-detecting device according to Embodiment. FIG. 11 is a block diagram of a controller included in the temperature-detecting device according to Embodiment.

The temperature-detecting device 1 includes a frame 2, a temperature-detecting unit 3, a driving unit 4, and a rotation-controlling unit 7. As illustrated in FIGS. 3 and 4, the frame 2 forms the outer shell of the temperature-detecting device 1. The frame 2 houses the temperature-detecting unit 3, the driving unit 4, and the rotation-controlling unit 7. The frame 2 includes an upper frame 2A and a lower frame 2B. The upper frame 2A and the lower frame 2B are joined to each other with joining components 2a, such as screws. The upper frame 2A and the lower frame 2B may alternatively be joined to each other with, for example, hooks provided to one of the two and holes provided to the other such that the hooks are to engage with the holes.

As illustrated in FIGS. 3 and 4, the upper frame 2A includes an upper casing 20 and a cylindrical upper sleeve 21. The upper casing 20 mainly houses a motor 40, which is included in the driving unit 4.

The upper sleeve 21 is open at its lower part but is closed at its upper part. The diameter of the upper sleeve 21 is smaller in the upper part than in the lower part, and a step 21a is formed between the upper part and the lower part. The upper sleeve 21 has groove-shaped lifting guides 24, which are provided inside the upper sleeve 21 and project upward from the step 21a. The lifting guides 24 are provided at respective two positions that are spaced apart from each other in the circumferential direction.

As illustrated in FIG. 5, the upper sleeve 21 has, at its inside, a key shaft 22, which projects in the axial direction from the center of the upper face of the upper sleeve 21. The upper sleeve 21 further has, at its inside, rotation stoppers 23, which project radially from the lateral face of the upper part of the upper sleeve 21. The rotation stoppers 23 are provided at respective two positions that are spaced apart from each other in the circumferential direction by, for example, about 135 degrees.

As illustrated in FIGS. 3 and 4, the lower frame 2B includes a lower casing 25 and a cylindrical lower sleeve 26. The lower casing 25 is positioned to face the upper casing 20 of the upper frame 2A. The lower casing 25 has a seat 27, on which a driving gear 6 is seated. The driving gear 6 is included in the driving unit 4. The seat 27 has, in its center, a boss 28.

The lower sleeve 26 is positioned to face the upper sleeve 21 of the upper frame 2A. The lower sleeve 26 is open at its upper part and its lower part. The lower sleeve 26 has, at its inner circumferential surface, a step 29, on which a flange 52 of the driving unit 4 is placed. The frame 2 houses the temperature-detecting unit 3, the driving unit 4, a liftable ring 8, and a rotary key 9, with the temperature-detecting unit 3 being exposed to the outside at a lower end of the lower frame 2B.

As illustrated in FIG. 3, the temperature-detecting unit 3 includes a sensor 30, a sensor cap 31, and a sensor case 34. The sensor 30 is configured to detect indoor temperature. The sensor 30 includes a sensor board on which an infrared-light sensor is mounted, and a board holder that holds the sensor board. The sensor board is of high accuracy and high resolution and is configured to detect heat generated by the sensor itself. The sensor 30 is housed in the sensor cap 31 with the sensor board being inclined downward in the vertical direction.

As illustrated in FIGS. 3 and 6, the sensor cap 31 houses and holds the sensor 30. The sensor cap 31 includes a cylindrical lower cap 32 and a cylindrical upper cap 33. The upper cap 33 has a smaller diameter than that of the lower cap 32.

The lower cap 32 is closed at its lower part but is open at its upper part. The lower cap 32 houses the sensor board of the sensor 30. As illustrated in FIG. 6, the lower cap 32 has, in its lower part, a hole 32a, which provides access to the inside of the lower cap 32. The hole 32a is provided for exposing the sensor board of the sensor 30 housed in the sensor cap 31 to the outside. That is, the sensor 30 is housed in the sensor cap 31 such that the sensor board is positioned at the hole 32a. The lower cap 32 has a projection 32b, which projects downward from the lower face of the lower cap 32.

The upper cap 33 is open at its upper part and its lower part. A cylindrical inner part of the upper cap 33 and a cylindrical inner part of the lower cap 32 are continuous with each other. As illustrated in FIGS. 3 and 6, the upper cap 33 has, at its upper end, a pair of slits 33a. The pair of slits 33a are positioned radially opposite each other.

As illustrated in FIGS. 3 and 7, the sensor case 34 has a cylindrical shape with a larger diameter than that of the lower cap 32 and covers the circumference of the lower cap 32. The sensor case 34 is closed at its lower part but is open at its upper part. The sensor case 34 houses, in its cylindrical inner part, the lower cap 32 in which the sensor 30 is provided. The sensor case 34 has, in its lower part, an opening 34a, which is provided for exposing the sensor board of the sensor 30 to the outside. The lower cap 32 is housed in the sensor case 34 such that the hole 32a is positioned at the opening 34a of the sensor case 34.

The sensor case 34 has, at its upper end edge, engaging holes 34b and engaging slits 34c, which are provided for engagement with a fixed gear 5. The engaging holes 34b are provided at respective two radially opposite positions. The engaging slits 34c are provided at respective two sides of each of the engaging holes 34b in the circumferential direction of the sensor case 34. The sensor case 34 has, at its inner bottom face, a projection-receiving portion 34d, into which the projection 32b at the lower face of the lower cap 32 is fitted.

The driving unit 4 is configured to drive the temperature-detecting unit 3 to rotate. As illustrated in FIG. 3, the driving unit 4 is positioned above the upper part of the sensor case 34. The driving unit 4 includes the fixed gear 5, the driving gear 6, and the motor 40.

As illustrated in FIG. 3, the fixed gear 5 includes an upper cylindrical body 50, a lower cylindrical body 51, and the flange 52, which has an annular shape. A cylindrical inner part of the upper cylindrical body 50 and a cylindrical inner part of the lower cylindrical body 51 are continuous with each other. The flange 52 is provided between a lower end of the upper cylindrical body 50 and an upper end of the lower cylindrical body 51. An upper part of the sensor cap 31 is inserted into the cylindrical inner parts of the upper cylindrical body 50 and the lower cylindrical body 51. The fixed gear 5 is supported by the lower frame 2B with the flange 52 being placed on the step 29 of the lower frame 2B.

As illustrated in FIG. 3, the upper cylindrical body 50 has, around its outer circumferential surface, first spur-gear teeth 53. The upper cylindrical body 50 further has, at its inner circumferential surface, two first engaging portions 54, which form walls projecting toward the center axis of the upper cylindrical body 50 and are positioned radially opposite each other. The first engaging portions 54 each have, for example, a trapezoidal shape or a parallelogrammatic shape, with its upper end edge being inclined upward or downward along the circumferential direction.

The lower cylindrical body 51 has hooks 51a and linear projections 51b. The hooks 51a are to engage with the respective engaging holes 34b of the sensor case 34. The linear projections 51b are vertically elongated and are to engage with the respective engaging slits 34c of the sensor case 34. The lower cylindrical body 51 is fitted into the sensor case 34 such that the hooks 51a engage with the engaging holes 34b and the linear projections 51b engage with the engaging slits 34c. Thus, the lower cylindrical body 51 is attached to the sensor case 34.

As illustrated in FIGS. 3 and 8, the driving gear 6 has a hollow shaft 60 and a second spur-gear teeth 61. The second spur-gear teeth 61 are provided around the outer circumference of the hollow shaft 60. The driving gear 6 is seated on the seat 27 of the lower frame 2B. The hollow shaft 60 includes an upper part serving as a motor-shaft-receiving portion 60a, and a lower part serving as a boss-receiving portion 60b. The boss-receiving portion 60b receives the boss 28 provided on the seat 27 of the lower frame 2B. The motor-shaft-receiving portion 60a has a rectangular cross-sectional shape. A motor shaft 40a of the motor 40 is inserted into the motor-shaft-receiving portion 60a. The boss-receiving portion 60b has a circular cross-sectional shape. The boss 28 of the lower frame 2B is inserted into the boss-receiving portion 60b such that the boss-receiving portion 60b is rotatable about its axis.

The second spur-gear teeth 61 are provided around the outer circumference of the boss-receiving portion 60b of the hollow shaft 60. The second spur-gear teeth 61 mesh with the first spur-gear teeth 53 of the fixed gear 5.

The motor 40 is housed in the upper casing 20 of the upper frame 2A and is fixed to the upper casing 20 with joining components such as screws. The motor 40 is oriented such that the motor shaft 40a extends downward. The motor shaft 40a is inserted into the motor-shaft-receiving portion 60a of the driving gear 6. When the motor 40 of the driving unit 4 is activated, a turning force generated by the motor 40 is transmitted through the driving gear 6 to the fixed gear 5 and causes the temperature-detecting unit 3, which is attached to the fixed gear 5, to rotate.

As illustrated in FIG. 3, the rotation-controlling unit 7 includes the liftable ring 8 and the rotary key 9. The rotation-controlling unit 7 is provided for controlling the rotation of the temperature-detecting unit 3. Specifically, the rotation-controlling unit 7 is configured to allow the sensor cap 31 to rotate synchronously with the sensor case 34 within a range of 360-degree rotation of the temperature-detecting unit 3 from a reference position, with the sensor 30 being exposed at the opening 34a of the sensor case 34. When the temperature-detecting unit 3 reaches a target angle, which is over 360 degrees from the reference position, the rotation-controlling unit 7 stops the rotation of the sensor cap 31, whereas the sensor case 34 is kept rotated by the driving unit 4. Therefore, the sensor 30 is displaced from the opening 34a. Consequently, the sensor 30 is covered by the sensor case 34.

As illustrated in FIG. 3, the liftable ring 8 is configured to rotate together with the driving unit 4 by being in engagement with the driving unit 4 and to be lifted against the driving unit 4 when the temperature-detecting unit 3 reaches the target angle that is over 360 degrees from the reference position. Specifically, the liftable ring 8 is fitted in the cylindrical inner part of the upper cylindrical body 50 of the fixed gear 5. As illustrated in FIG. 9, the liftable ring 8 has, at its upper end edge, an annular flange 80, which projects toward the center axis of the liftable ring 8. When the liftable ring 8 is fitted into the cylindrical inner part of the upper cylindrical body 50, the flange 80 comes into contact with the upper end edge of the upper cap 33. Thus, the liftable ring 8 is supported by the upper cap 33.

As illustrated in FIG. 9, the liftable ring 8 has, at its outer face, lifting stoppers 81, which each have an L shape projecting upward. The lifting stoppers 81 are provided at respective two radially opposite positions of the liftable ring 8. When the liftable ring 8 is lifted against the driving unit 4, the lifting stoppers 81 are fitted to the lifting guides 24 provided in the upper frame 2A, and the liftable ring 8 thus stops being lifted.

As illustrated in FIG. 9, the liftable ring 8 has, at its inner face, vertically elongated ribs 82, which are configured to engage with the respective slits 33a provided in the upper cap 33. The ribs 82 are provided at respective two radially opposite positions of the liftable ring 8. With the ribs 82 being in engagement with the slits 33a, the liftable ring 8 is in engagement with the upper cap 33. When the liftable ring 8 is lifted against the driving unit 4, the ribs 82 disengage from the slits 33a. The ribs 82 and the slits 33a are in engagement with each other by a length smaller than a length by which the liftable ring 8 is liftable.

As illustrated in FIG. 9, the liftable ring 8 has, at its upper end, a rotation stopper 83, which projects upward. The rotation of the liftable ring 8 is stopped when the rotation stopper 83 is stopped by the rotary key 9. The rotation stopper 83 is continuous with one of the ribs 82.

As illustrated in FIG. 9, the liftable ring 8 has, at its lower end edge, second engaging portions 84, which are to engage with the respective first engaging portions 54 with the liftable ring 8 being fitted in the upper cylindrical body 50 of the fixed gear 5. The second engaging portions 84 are provided at respective two radially opposite positions. The second engaging portions 84 are inclined in the same direction and at the same angle as the respective first engaging portions 54 of the fixed gear 5.

Within the range of 360-degree rotation of the temperature-detecting unit 3 from the reference position, the second engaging portions 84 of the liftable ring 8 are kept in engagement with the first engaging portions 54. Therefore, the liftable ring 8 rotates synchronously with the fixed gear 5. When the temperature-detecting unit 3 reaches the target angle that is over 360 degrees from the reference position, the rotation stopper 83 of the liftable ring 8 is stopped by the rotary key 9. Therefore, the liftable ring 8 stops rotating. In this state, when the fixed gear 5 rotates, the first engaging portions 54 slide against the second engaging portions 84, and the liftable ring 8 is thus lifted. When the liftable ring 8 is lifted, the second engaging portions 84 disengage from the first engaging portions 54, and the ribs 82 disengage from the slits 33a. The lifting of the liftable ring 8 is stopped when the lifting stoppers 81 are fitted into the lifting guides 24. That is, when the target angle of rotation is reached, the turning force applied from the fixed gear 5 to the liftable ring 8 is converted into a stress that displaces the liftable ring 8 upward.

The liftable ring 8 has, at its lower end edge, a rotation-stopping projection 85, in addition to the second engaging portions 84. The rotation-stopping projection 85 projects downward from the lower end edge of the liftable ring 8. After the liftable ring 8 stops being lifted, the rotation-stopping projection 85 comes into contact with one of the first engaging portions 54 and thus stops the rotation of the fixed gear 5.

The rotary key 9 is configured to stop the rotation of the liftable ring 8. As illustrated in FIGS. 3 and 10, the rotary key 9 has a substantially L shape in side view. The rotary key 9 includes a key-shaft receiver 90 and a key wall 91. The key-shaft receiver 90 forms the horizontal part of the L shape. The key wall 91 forms the vertical part of the L shape. The key-shaft receiver 90 receives the key shaft 22 provided in the upper frame 2A. The key wall 91 has a groove shape that is depressed inward. Two end edges of the key wall 91 in the circumferential direction serve as upper stoppers 91a and 91b.

The rotary key 9 receives the key shaft 22 inserted into the key-shaft receiver 90 and is thus attached to the upper frame 2A. The key wall 91 of the rotary key 9 is positioned between stopper pieces 23a and 23b. The rotary key 9 is rotatable about the key shaft 22 but between the two stopper pieces 23a and 23b. That is, the rotary key 9 is rotatable from a position where one of the upper stoppers, that is, the upper stopper 91a, comes into contact with one of the stopper pieces, that is, the stopper piece 23a, to a position where the other upper stopper 91b comes into contact with the other stopper piece 23b.

The key wall 91 has, at its lower face, a lower stopper 92, which projects downward. The lower stopper 92 and the rotation stopper 83 of the liftable ring 8 are configured to be in surface contact with each other at their lateral faces. Specifically, while the rotation stopper 83 of the liftable ring 8 is in surface contact with the lower stopper 92 of the rotary key 9, the rotary key 9 rotates together with the rotation of the liftable ring 8. The rotary key 9 stops the rotation of the liftable ring 8 when the upper stopper 91a comes into contact with the stopper piece 23a or when the upper stopper 91b comes into contact with the stopper piece 23b.

A controller 35 includes, for example, an arithmetic device such as a microcomputer and a CPU, and software to be executed on the arithmetic device. Alternatively, the controller 35 may be a hardware device such as a circuit device configured to achieve relevant functions.

As illustrated in FIG. 11, the controller 35 includes a drive control unit 35a, a temperature acquisition unit 35b, and an arithmetic unit 35c. The controller 35 outputs a control signal from the drive control unit 35a to the motor 40. The control signal output to the motor 40 contains information regarding the rotation, the direction of rotation, the end of rotation, and other relevant factors. The motor 40 is operated with reference to the control signal received from the drive control unit 35a.

The temperature acquisition unit 35b receives the result of detection that is output from the sensor 30. The arithmetic unit 35c calculates the temperature of a heat source in the conditioned space with reference to the result of detection by the sensor 30. Specifically, the arithmetic unit 35c is configured to correct the temperature that is detected while the sensor 30 is exposed at the opening 34a of the sensor case 34, with reference to the temperature that is detected while the sensor 30 is covered.

The controller 35 configured as above may be provided inside the frame 2 or inside the housing 10 of the indoor unit 100. Alternatively, the controller 35 may be provided outside the indoor unit 100.

A process of assembling the temperature-detecting device 1 according to Embodiment will be briefly described below. First, the sensor cap 31 provided with, at its inside, the sensor 30 is set in the sensor case 34. The sensor cap 31 is inserted into the opening at the upper part of the sensor case 34 such that the projection 32b is fitted into the projection-receiving portion 34d of the sensor case 34. Thus, the sensor cap 31 is set in the sensor case 34. Then, the fixed gear 5 is set on the upper part of the sensor cap 31. The upper part of the sensor cap 31 is inserted into a cylindrical inner part of the cylindrical fixed gear 5 such that the hooks 51a engage with the engaging holes 34b of the sensor case 34 and the linear projections 51b engage with the engaging slits 34c of the sensor case 34. Thus, the fixed gear 5 is fixed to the sensor case 34.

Subsequently, the sensor case 34 coupled to the fixed gear 5 is inserted into a cylindrical inner part of the cylindrical lower sleeve 26. The flange 52 of the fixed gear 5 is supported by being placed on the step 29.

Subsequently, the motor shaft 40a of the motor 40 is inserted into the motor-shaft-receiving portion 60a of the driving gear 6. Furthermore, the second spur-gear teeth 61 and the first spur-gear teeth 53 are made to mesh with each other, the boss 28 is inserted into the boss-receiving portion 60b, and the driving gear 6 is thus seated on the seat 27.

Subsequently, the liftable ring 8 is inserted into the upper cylindrical body 50. In this step, the second engaging portions 84 of the liftable ring 8 and the first engaging portions 54 of the upper cylindrical body 50 engage with each other. Furthermore, the ribs 82 of the liftable ring 8 engage with the slits 33a of the upper cap 33. Thus, the liftable ring 8 is coupled to the sensor cap 31. Then, the key shaft 22 of the upper frame 2A is inserted into the key-shaft receiver 90 of the rotary key 9. Thus, the rotary key 9 and the upper frame 2A are coupled to each other. Lastly, the upper frame 2A and the lower frame 2B are joined to each other with a joining means such as a screw and a hook.

A rotary motion of the temperature-detecting unit 3 of the temperature-detecting device 1 according to Embodiment will be described below. In the following description, a rotation angle of the temperature-detecting unit 3 of 0 degrees is defined as the reference position. At the reference position, the front face of the sensor 30 is oriented toward the air-conditioned space. The rotation angle refers to the angle of counterclockwise rotation of the sensor 30 from the reference position against the air-conditioned space. Note that rotation angles to be given in the following description are only exemplary and are not limited to the description.

<When Temperature-Detecting Unit 3 is at 0-Degree Rotation Angle>

Figure 12:
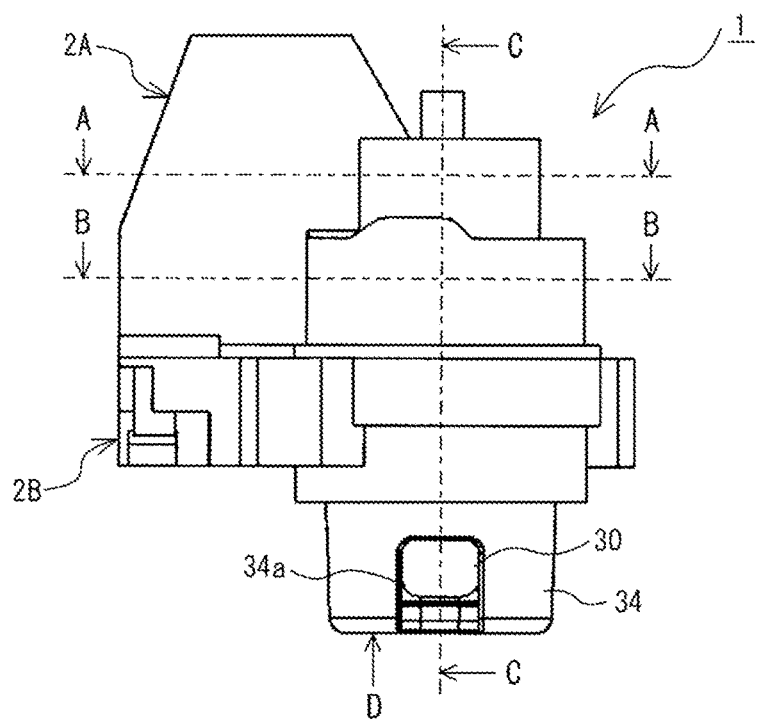
FIG. 12 is an explanatory diagram for indicating positions of sections illustrated in FIGS. 12 to 30.
Figure 13:
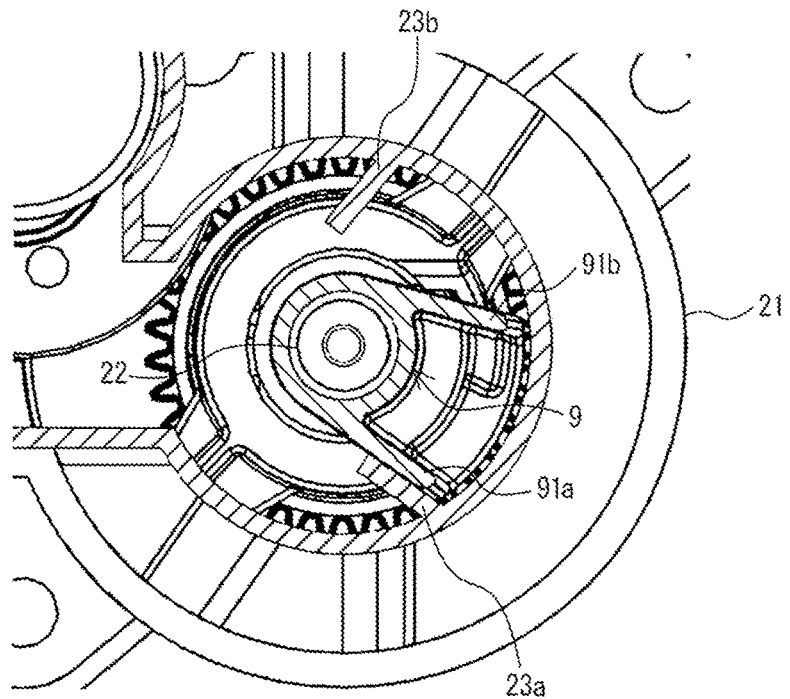
FIG. 13 illustrates a section taken along line A-A illustrated in FIG. 12, with a temperature-detecting unit being at a rotation angle of 0 degrees.
Figure 14:
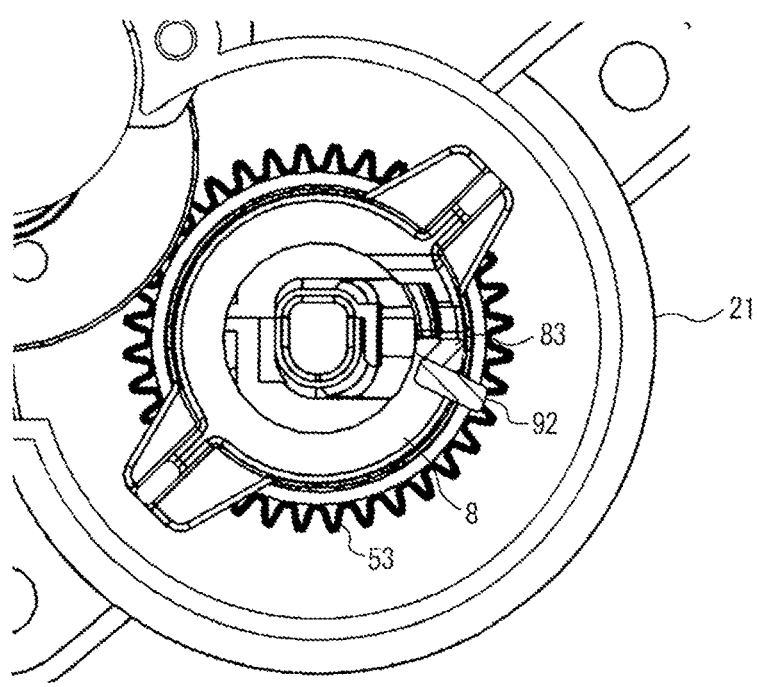
FIG. 14 illustrates a section taken along line B-B illustrated in FIG. 12, with the temperature-detecting unit being at the rotation angle of 0 degrees.
Figure 15:
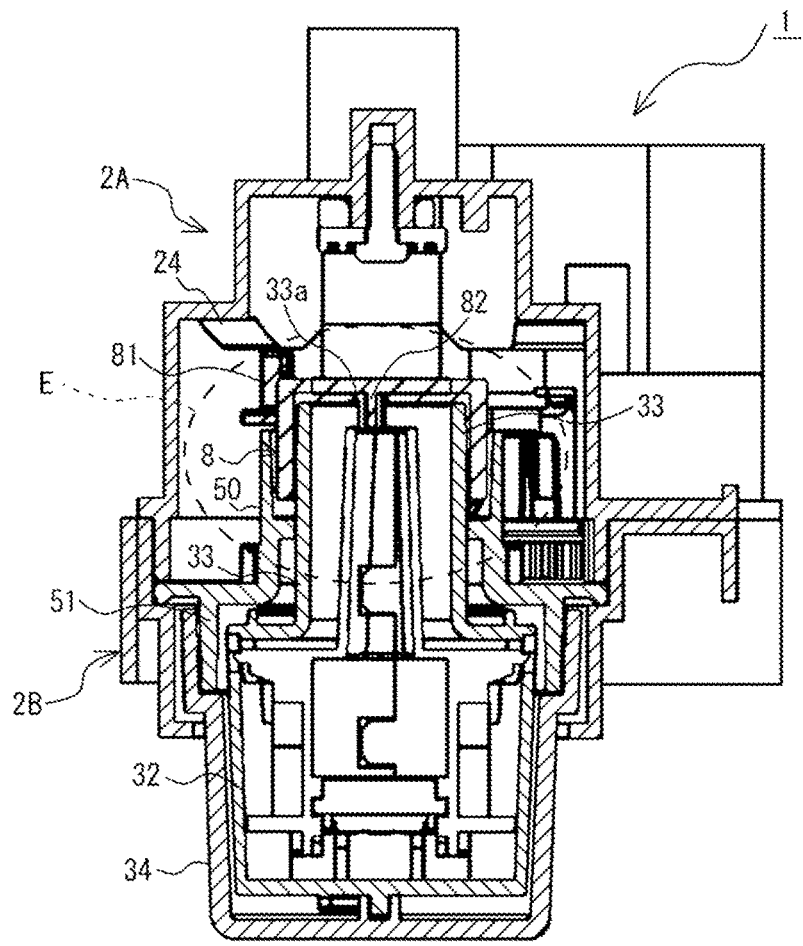
FIG. 15 illustrates a section taken along line C-C illustrated in FIG. 12, with the temperature-detecting unit being at the rotation angle of 0 degrees.
Figure 16:
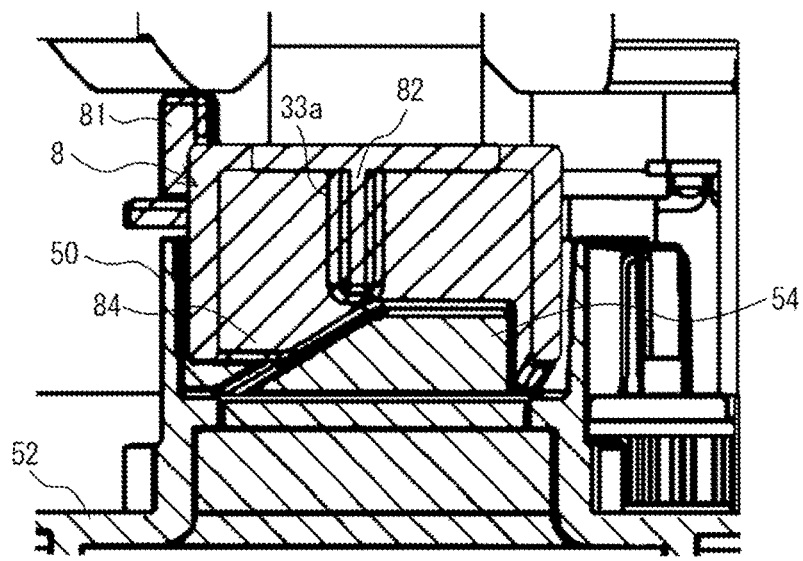
FIG. 16 is an explanatory diagram that illustrates part E illustrated in FIG. 15.
Figure 17:
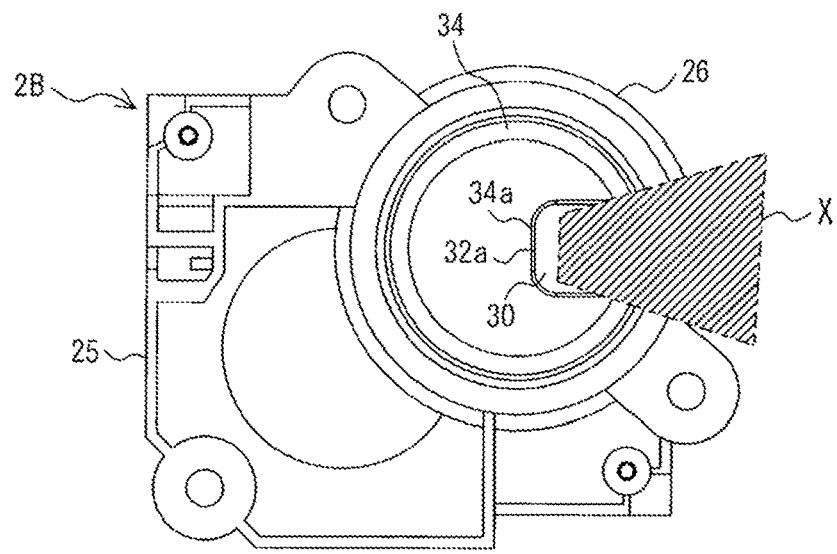
FIG. 17 illustrates a bottom view in the direction of arrow D illustrated in FIG. 12, with the temperature-detecting unit being at the rotation angle of 0 degrees.

With reference to FIGS. 12 to 17, a case where the temperature-detecting device 1 is at the rotation angle of 0 degrees will first be described. FIG. 12 is an explanatory diagram for indicating positions of sections illustrated in FIGS. 12 to 30. FIG. 13 illustrates a section taken along line A-A illustrated in FIG. 12, with the temperature-detecting unit being at the rotation angle of 0 degrees. FIG. 14 illustrates a section taken along line B-B illustrated in FIG. 12, with the temperature-detecting unit being at the rotation angle of 0 degrees. FIG. 15 illustrates a section taken along line C-C illustrated in FIG. 12, with the temperature-detecting unit being at the rotation angle of 0 degrees. FIG. 16 is an explanatory diagram that illustrates part E illustrated in FIG. 15. FIG. 17 illustrates a bottom view in the direction of arrow D illustrated in FIG. 12, with the temperature-detecting unit being at the rotation angle of 0 degrees. Hatched part X illustrated in FIG. 17 represents the angle of view of the sensor 30.

As illustrated in FIG. 13, when the temperature-detecting unit 3 is at the rotation angle of 0 degrees, the one upper stopper 91a of the rotary key 9 is in contact with the one stopper piece 23a of the upper frame 2A. Thus, the position of the rotary key 9 is fixed. At this position, as illustrated in FIG. 14, the rotation stopper 83 of the liftable ring 8 is in contact with one of the lateral faces of the lower stopper 92 of the rotary key 9.

As illustrated in FIG. 15, the ribs 82 of the liftable ring 8 are fitted in the slits 33a of the upper cap 33. Furthermore, as illustrated in FIG. 16, the first engaging portions 54 of the fixed gear 5 are in engagement with the second engaging portions 84 of the liftable ring 8. Thus, the sensor cap 31 and the sensor case 34 are coupled to each other with the aid of the fixed gear 5 and the liftable ring 8. In this state of the temperature-detecting unit 3, as illustrated in FIG. 17, the hole 32a of the sensor cap 31 and the opening 34a of the sensor case 34 are at the same position. Therefore, the sensor 30 is fully exposed at the opening 34a of the sensor case 34.

<When Temperature-Detecting Unit 3 is at 335-Degree Rotation Angle>

Figure 18:
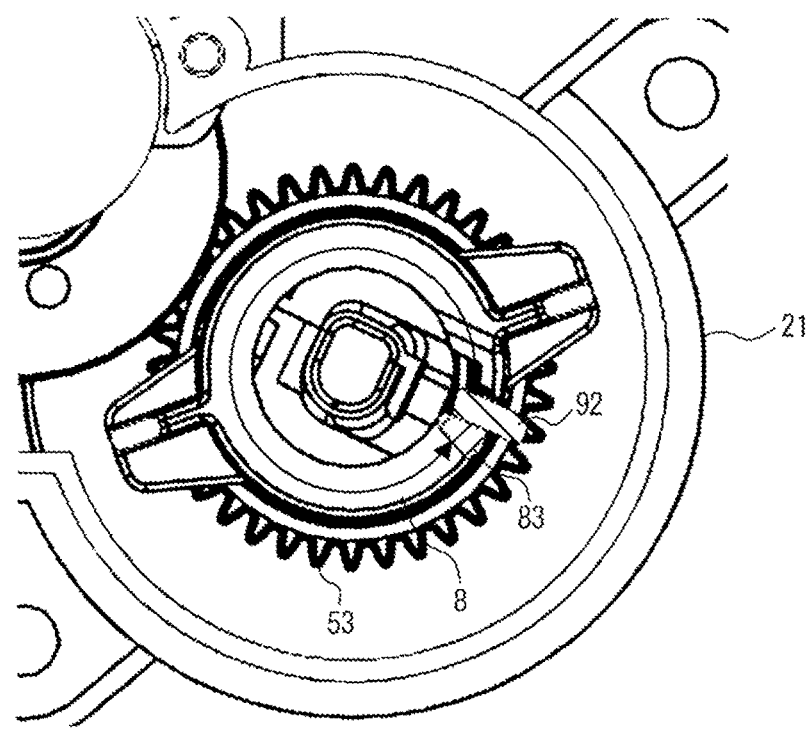
FIG. 18 illustrates the section taken along line B-B illustrated in FIG. 12, with the temperature-detecting unit being at a rotation angle of 335 degrees.
Figure 19:
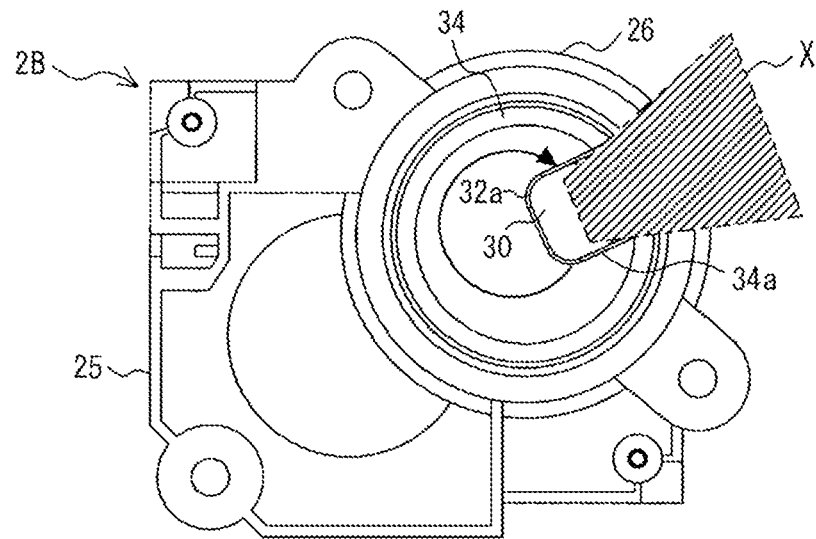
FIG. 19 illustrates the bottom view in the direction of arrow D illustrated in FIG. 12, with the temperature-detecting unit being at the rotation angle of 335 degrees.

With reference to FIGS. 18 and 19, a state where the temperature-detecting device 1 has rotated counterclockwise from 0 degrees to 335 degrees will be described below. FIG. 18 illustrates the section taken along line B-B illustrated in FIG. 12, with the temperature-detecting unit being at the rotation angle of 335 degrees. FIG. 19 illustrates the bottom view in the direction of arrow D illustrated in FIG. 12, with the temperature-detecting unit being at the rotation angle of 335 degrees. Hatched part X illustrated in FIG. 19 represents the angle of view of the sensor 30.

In the temperature-detecting device 1, when the temperature-detecting unit 3 rotates counterclockwise from 0 degrees to 335 degrees, as illustrated in FIG. 18, the rotation stopper 83 of the liftable ring 8 comes into contact with the other lateral face of the lower stopper 92 of the rotary key 9. The sensor case 34 and the sensor cap 31 are coupled to each other with the aid of the fixed gear 5 and the liftable ring 8. Therefore, as illustrated in FIG. 19, the hole 32a of the sensor cap 31 and the opening 34a of the sensor case 34 rotate synchronously with each other. That is, in the temperature-detecting unit 3, the hole 32a of the sensor cap 31 and the opening 34a of the sensor case 34 are at the same position. Therefore, the sensor 30 is fully exposed at the opening 34a of the sensor case 34.

<When Temperature-Detecting Unit 3 is at 360-Degree Rotation Angle>

Figure 20:
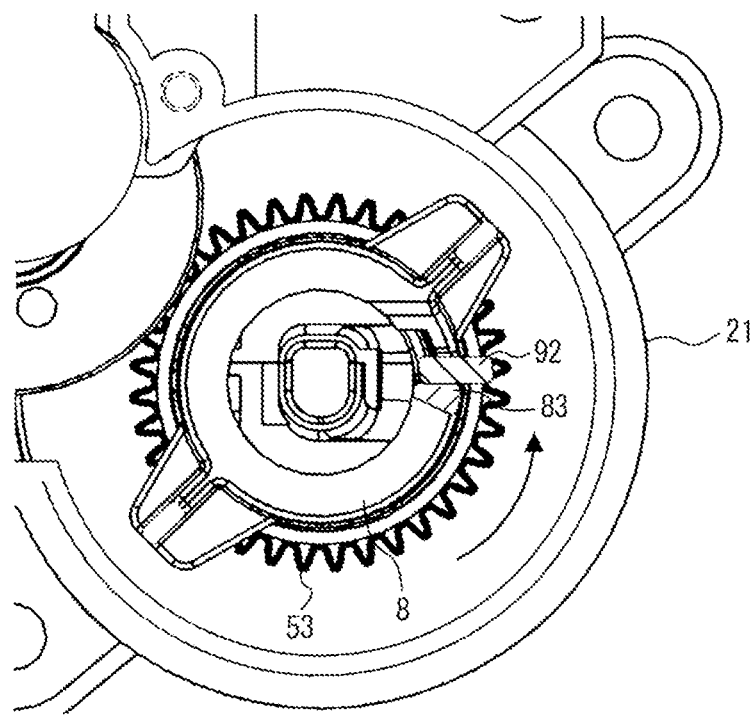
FIG. 20 illustrates the section taken along line B-B illustrated in FIG. 12, with the temperature-detecting unit being at a rotation angle of 360 degrees.
Figure 21:
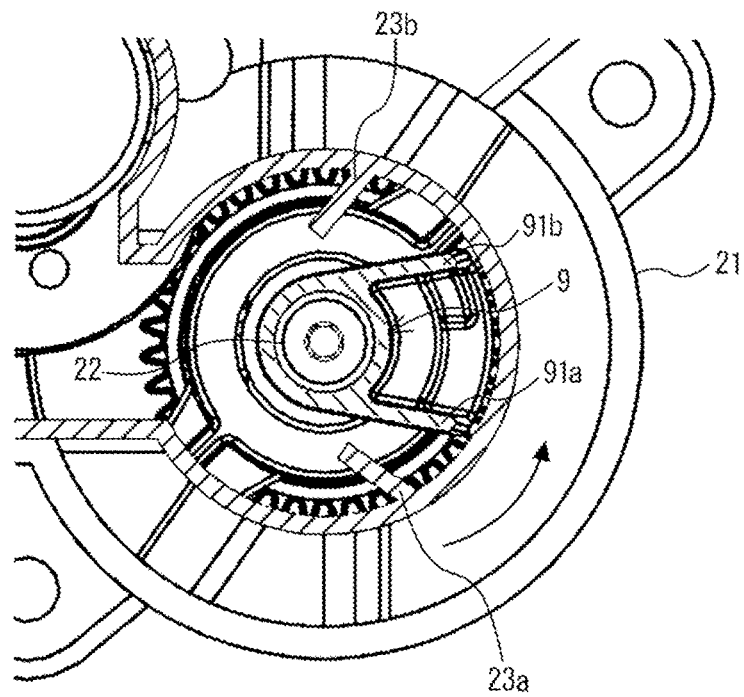
FIG. 21 illustrates the section taken along line A-A illustrated in FIG. 12, with the temperature-detecting unit being at the rotation angle of 360 degrees.
Figure 22:
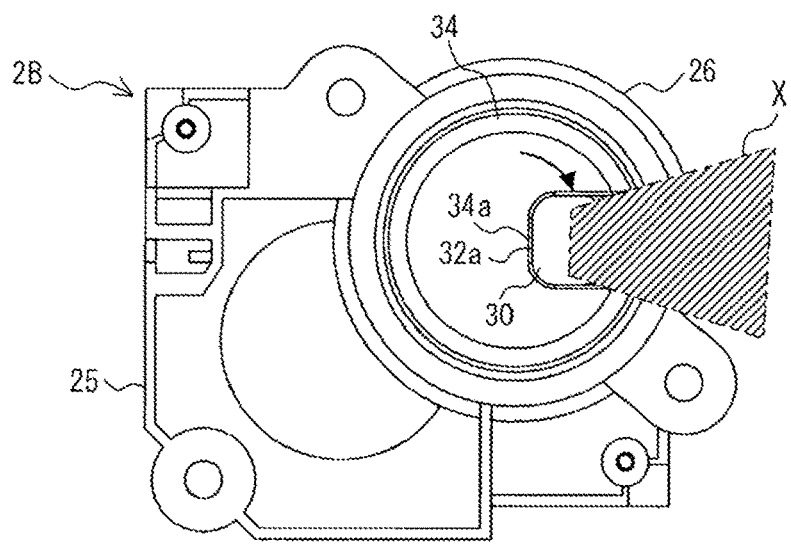
FIG. 22 illustrates the bottom view in the direction of arrow D illustrated in FIG. 12, with the temperature-detecting unit being at the rotation angle of 360 degrees.

With reference to FIGS. 20 to 22, a state where the temperature-detecting unit 3 has rotated counterclockwise to 360 degrees will be described below. FIG. 20 illustrates the section taken along line B-B illustrated in FIG. 12, with the temperature-detecting unit being at the rotation angle of 360 degrees. FIG. 21 illustrates the section taken along line A-A illustrated in FIG. 12, with the temperature-detecting unit being at the rotation angle of 360 degrees. FIG. 22 illustrates the bottom view in the direction of arrow D illustrated in FIG. 12, with the temperature-detecting unit being at the rotation angle of 360 degrees. Hatched part X illustrated in FIG. 22 represents the angle of view of the sensor 30.

Figure 23:
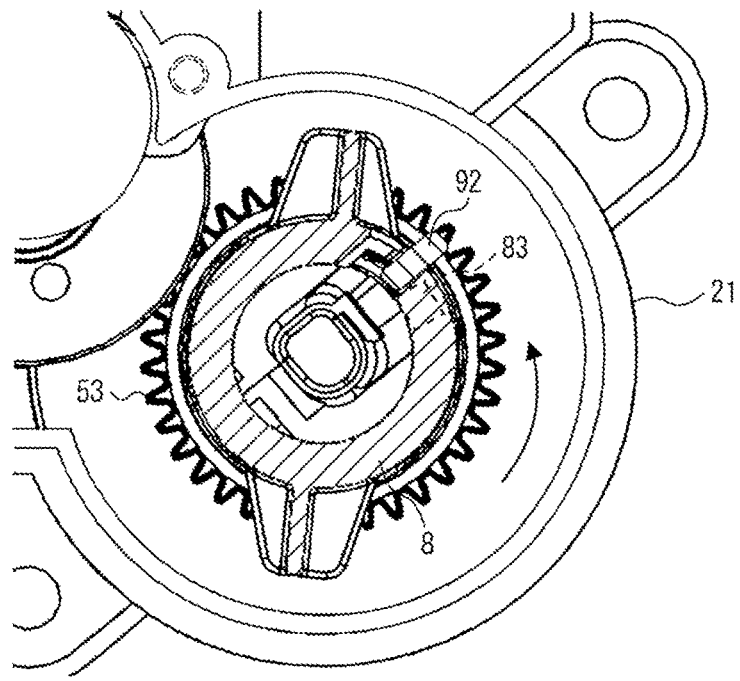
FIG. 23 illustrates the section taken along line B-B illustrated in FIG. 12, with the temperature-detecting unit being at a rotation angle of 420 degrees.

In the temperature-detecting device 1, when the temperature-detecting unit 3 at 335 degrees further rotates, as illustrated in FIG. 20, the lower stopper 92 is pushed by the rotation stopper 83, and the rotary key 9 thus rotates counterclockwise about the key shaft 22 as illustrated in FIG. 21. The sensor case 34 and the sensor cap 31 are coupled to each other with the aid of the fixed gear 5 and the liftable ring 8. Therefore, as illustrated in FIG. 23, the hole 32a of the sensor cap 31 and the opening 34a of the sensor case 34 rotate synchronously with each other. That is, in the temperature-detecting unit 3, the hole 32a of the sensor cap 31 and the opening 34a of the sensor case 34 are at the same position. Therefore, the sensor 30 is fully exposed at the opening 34a of the sensor case 34.

<When Temperature-Detecting Unit 3 is at 420-Degree Rotation Angle>

Figure 24:
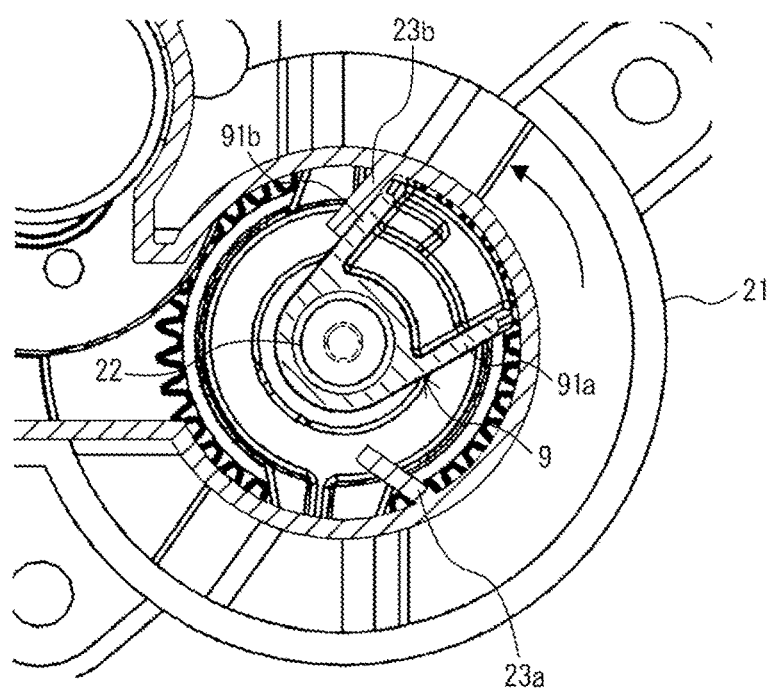
FIG. 24 illustrates the section taken along line A-A illustrated in FIG. 12, with the temperature-detecting unit being at the rotation angle of 420 degrees.
Figure 25:
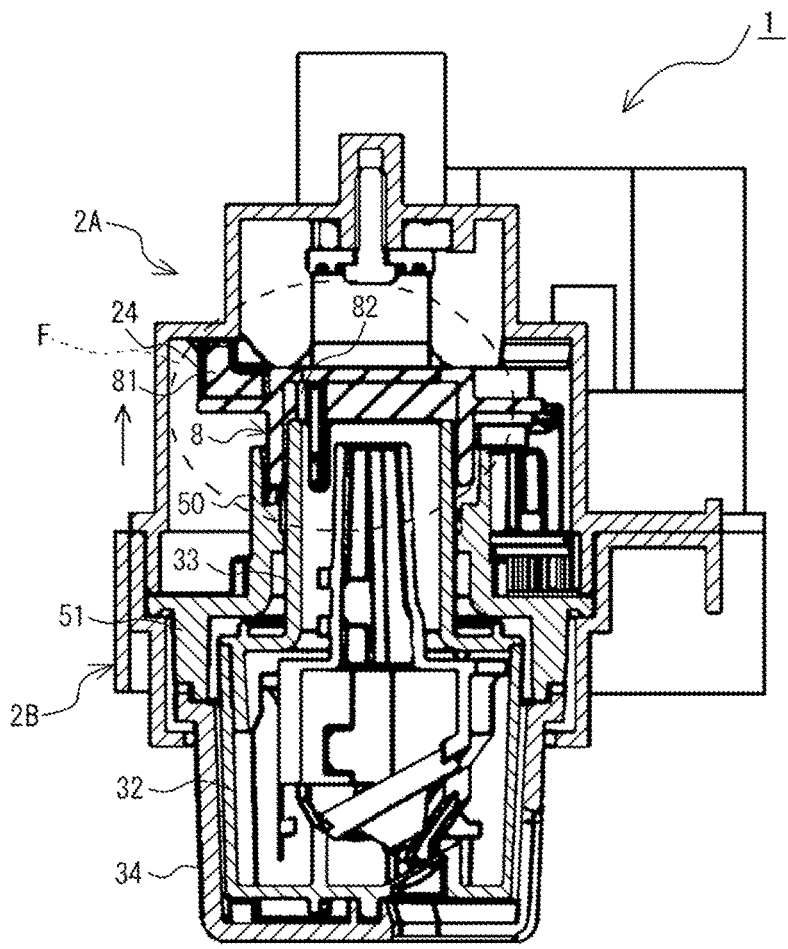
FIG. 25 illustrates the section taken along line C-C illustrated in FIG. 12, with the temperature-detecting unit being at the rotation angle of 420 degrees.
Figure 26:
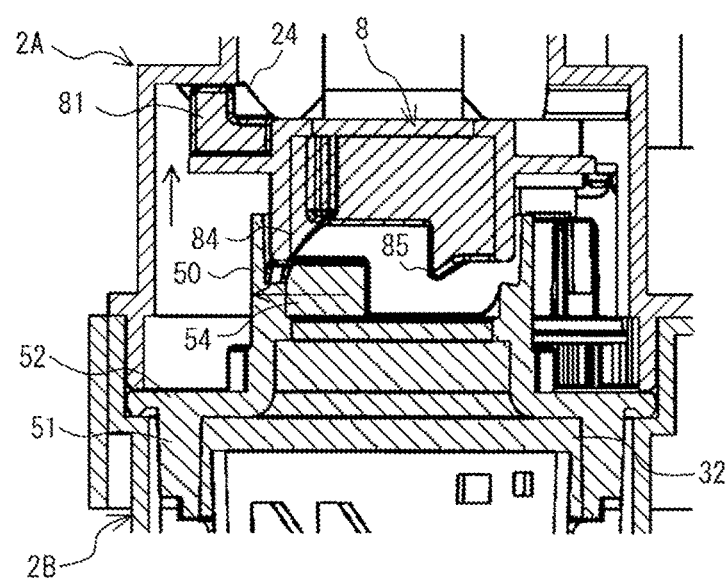
FIG. 26 is an explanatory diagram that illustrates part F illustrated in FIG. 25.
Figure 27:
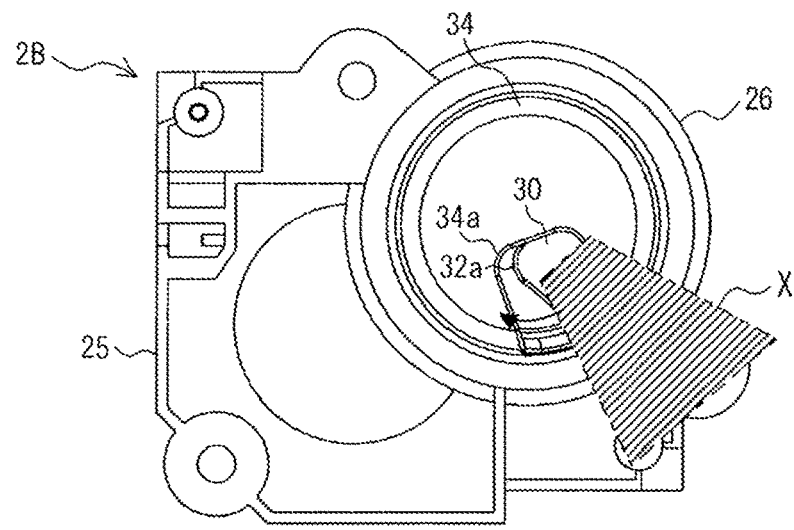
FIG. 27 illustrates the bottom view in the direction of arrow D illustrated in FIG. 12, with the temperature-detecting unit being at the rotation angle of 420 degrees.

With reference to FIGS. 23 to 27, a state where the temperature-detecting device 1 has rotated counterclockwise to 420 degrees will be described below. FIG. 23 illustrates the section taken along line B-B illustrated in FIG. 12, with the temperature-detecting unit being at the rotation angle of 420 degrees. FIG. 24 illustrates the section taken along line A-A illustrated in FIG. 12, with the temperature-detecting unit being at the rotation angle of 420 degrees. FIG. 25 illustrates the section taken along line C-C illustrated in FIG. 12, with the temperature-detecting unit being at the rotation angle of 420 degrees. FIG. 26 is an explanatory diagram that illustrates part F illustrated in FIG. 25. FIG. 27 illustrates the bottom view in the direction of arrow D illustrated in FIG. 12, with the temperature-detecting unit being at the rotation angle of 420 degrees. Hatched part X illustrated in FIG. 27 represents the angle of view of the sensor 30.

In the temperature-detecting device 1, when the rotation angle of the temperature-detecting unit 3 reaches the target angle that is over 360 degrees, as illustrated in FIG. 23, the lower stopper 92 is pushed by the rotation stopper 83. Eventually, as illustrated in FIG. 24, the other upper stopper 91b of the rotary key 9 comes into contact with the other stopper piece 23b, and the rotary key 9 thus stops rotating.

Meanwhile, the rotation stopper 83 of the liftable ring 8 is prevented from moving by the lower stopper 92. Therefore, the liftable ring 8 stops rotating. In this state, when the fixed gear 5 rotates, as illustrated in FIGS. 25 and 26, the first engaging portions 54 slide against the second engaging portions 84, and the liftable ring 8 is thus lifted. Since the liftable ring 8 is lifted, the second engaging portions 84 disengage from the first engaging portions 54, and the ribs 82 disengage from the slits 33a. Thus, the sensor cap 31 stops rotating. Meanwhile, the sensor case 34 fixed to the fixed gear 5 is driven by the driving unit 4 to rotate. Therefore, in the temperature-detecting unit 3, as illustrated in FIG. 27, the hole 32a of the sensor cap 31 and the opening 34a of the sensor case 34 are displaced from each other. Consequently, part of the sensor 30 is covered by the sensor case 34.

<When Temperature-Detecting Unit 3 is at 495-Degree Rotation Angle>

Figure 28:
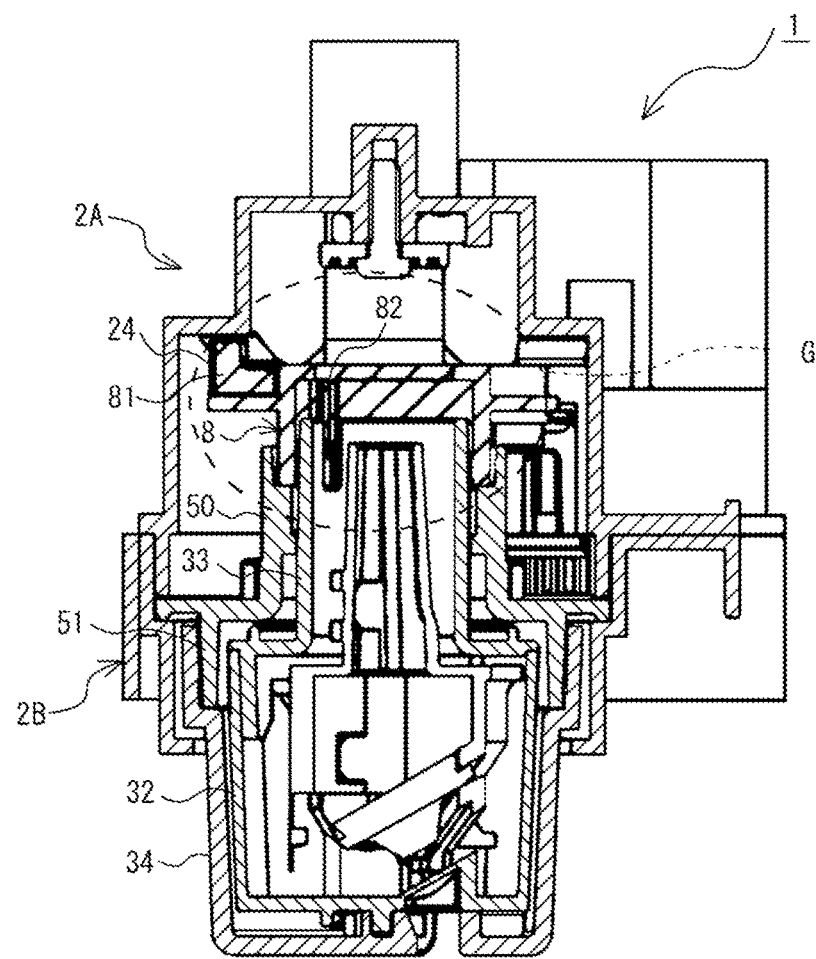
FIG. 28 illustrates the section taken along line C-C illustrated in FIG. 12, with the temperature-detecting unit being at a rotation angle of 495 degrees.
Figure 29:
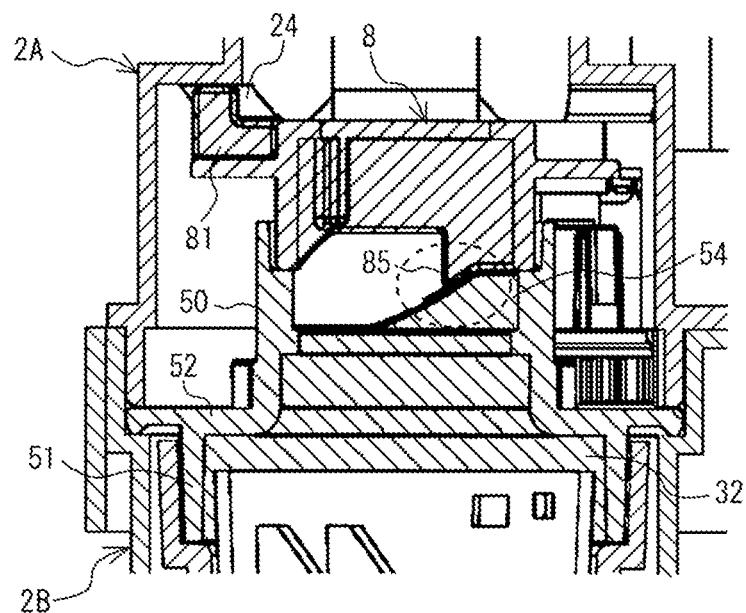
FIG. 29 is an explanatory diagram that illustrates part G illustrated in FIG. 28.
Figure 30:
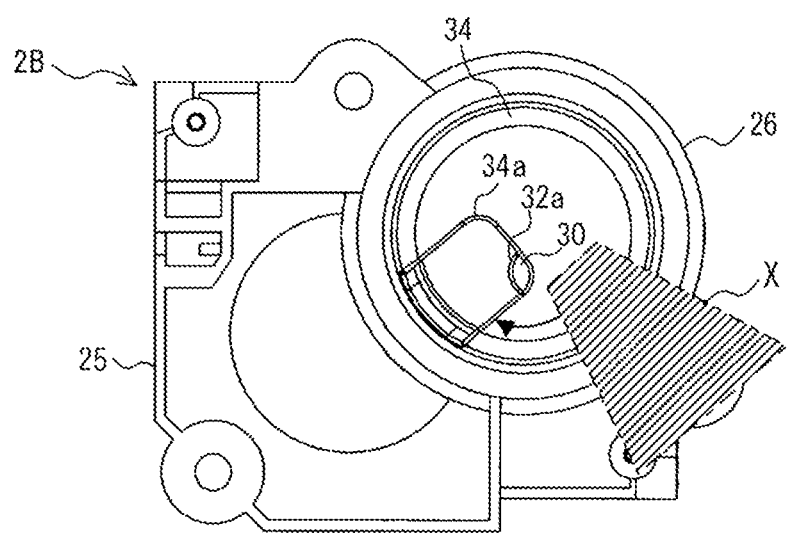
FIG. 30 illustrates the bottom view in the direction of arrow D illustrated in FIG. 12, with the temperature-detecting unit being at the rotation angle of 495 degrees.

With reference to FIGS. 28 to 30, a state where the temperature-detecting device 1 has rotated counterclockwise to 495 degrees will be described below. FIG. 28 illustrates the section taken along line C-C illustrated in FIG. 12, with the temperature-detecting unit being at the rotation angle of 495 degrees. FIG. 29 is an explanatory diagram that illustrates part G illustrated in FIG. 28. FIG. 30 illustrates the bottom view in the direction of arrow D illustrated in FIG. 12, with the temperature-detecting unit being at the rotation angle of 495 degrees. Hatched part X illustrated in FIG. 30 represents the angle of view of the sensor 30.

When the temperature-detecting unit 3 at 420 degrees further rotates counterclockwise to 495 degrees, the lifting stoppers 81 of the liftable ring 8 are fitted to the lifting guides 24 of the upper frame 2A, and the liftable ring 8 thus stops being lifted. Furthermore, as illustrated in FIGS. 28 and 29, the rotation-stopping projection 85 at the lower end edge of the liftable ring 8 comes into contact with one of the first engaging portions 54, and the rotation-stopping projection 85 thus stops the rotation of the fixed gear 5. In this state of the temperature-detecting unit 3, as illustrated in FIG. 30, the hole 32a of the sensor cap 31 and the opening 34a of the sensor case 34 are completely out of position from each other. Thus, the entirety of the sensor 30 is covered by the sensor case 34.

Then, the controller 35 controls the direction of rotation of the motor 40 such that the temperature-detecting unit 3 rotates clockwise. Furthermore, the controller 35 corrects the temperature detected while the sensor 30 is exposed at the opening 34a of the sensor case 34, with reference to the temperature detected while the sensor 30 is covered.

As described above, the temperature-detecting device 1 according to Embodiment includes the frame 2 serving as the outer shell, the temperature-detecting unit 3 held inside the frame 2 such that the temperature-detecting unit 3 is rotatable, the driving unit 4 configured to drive the temperature-detecting unit 3 to rotate, the rotation-controlling unit 7 configured to control the rotation of the temperature-detecting unit 3, and the controller 35 configured to correct the temperature detected by the temperature-detecting unit 3. The temperature-detecting unit 3 includes the sensor 30 configured to detect temperature, the sensor cap 31 in which the sensor 30 is held, and the sensor case 34 having the opening 34a and by which the sensor cap 31 is held such that the sensor cap 31 is rotatable, the opening 34a allowing the sensor 30 to be exposed to the outside. The rotation-controlling unit 7 is configured to allow the sensor cap 31 to rotate synchronously with the sensor case 34 within the range of 360-degree rotation of the temperature-detecting unit 3 from the reference position, with the sensor 30 being exposed at the opening 34a of the sensor case 34. The rotation-controlling unit 7 is also configured to stop the rotation of the sensor cap 31 when the temperature-detecting unit 3 reaches the target angle that is over 360 degrees from the reference position, with the sensor case 34 being kept rotating such that the sensor 30 is displaced from the opening 34a and is covered by the sensor case 34. The controller 35 is configured to correct the temperature detected while the sensor 30 is exposed at the opening 34a, with reference to the temperature detected while the sensor 30 is covered by the sensor case 34.

In the temperature-detecting device 1 according to Embodiment and the air-conditioning-apparatus indoor unit 100 including the temperature-detecting device 1, the sensor cap 31 and the sensor case 34 are allowed to rotate synchronously with each other within the range of 360-degree rotation of the temperature-detecting unit 3 from the reference position with the sensor 30 being exposed at the opening 34a of the sensor case 34. Therefore, the temperature-detecting device 1 according to Embodiment and the air-conditioning-apparatus indoor unit 100 are configured to detect the temperature of the conditioned space while rotating the sensor 30 by 360 degrees. Furthermore, when the temperature-detecting unit 3 reaches the target angle that is over 360 degrees, the rotation of the sensor cap 31 is stopped, whereas the sensor case 34 is kept rotating. Therefore, the sensor 30 is displaced from the opening 34a. Consequently, the sensor 30 is covered by the sensor case 34. The controller 35 is configured to correct the temperature detected while the sensor 30 is exposed at the opening 34a, with reference to the temperature of the heat generated by the sensor itself and detected while the sensor 30 is covered by the sensor case 34. Therefore, the temperature-detecting device 1 according to Embodiment and the air-conditioning-apparatus indoor unit 100 including the temperature-detecting device 1 achieve temperature detection with increased accuracy without being affected by the temperature of the heat generated by the sensor itself.

While the temperature-detecting device 1 and the air-conditioning-apparatus indoor unit 100 including the temperature-detecting device 1 have been described above with reference to Embodiment, the configurations of the temperature-detecting device 1 and the air-conditioning-apparatus indoor unit 100 including the temperature-detecting device 1 are not limited to those described in Embodiment given above. For example, the elements of the temperature-detecting device 1 and the air-conditioning-apparatus indoor unit 100 including the temperature-detecting device 1 are not limited to those described above and may include other elements. Moreover, the temperature-detecting device 1 does not necessarily need to be included in the air-conditioning-apparatus indoor unit 100 and may be included in another apparatus. In short, the temperature-detecting device 1 and the air-conditioning-apparatus indoor unit 100 including the temperature-detecting device 1 encompass any design changes and applied variations that are normally made by those skilled in the art without departing from the technical spirit.

REFERENCE SIGNS LIST

1: temperature-detecting device, 2: frame, 2A: upper frame, 2B: lower frame, 2a: joining component, 3: temperature-detecting unit, 4: driving unit, 5: fixed gear, 6: driving gear, 7: rotation-controlling unit, 8: liftable ring, 9: rotary key, 10: housing, 10a: first opening, 10*b*: second opening, 11: indoor fan, 12: indoor heat exchanger, 13: drain pan, 14: fan-driving motor, 15: bell mouth, 16: decorative panel, 16*a*: air outlet, 17: inlet grille, 18: cover, 20: upper casing, 21: upper sleeve, 21*a*: step, 22: key shaft, 23*a*, 23*b*: stopper piece, 24: lifting guide, 25: lower casing, 26: lower sleeve, 27: seat, 28: boss, 29: step, 30: sensor, 31: sensor cap, 32: lower cap, 32*a*: hole, 32*b*: projection, 33: upper cap, 33*a*: slit, 34: sensor case, 34*a*: opening, 34*b*: engaging hole, 34*c*: engaging slit, 34*d*: projection-receiving portion, 35: controller, 35*a*: drive control unit, 35*b*: temperature acquisition unit, 35*c*: arithmetic unit, 40: motor, 40*a*: motor shaft, 50: upper cylindrical body, 51: lower cylindrical body, 51*a*: hook, 51*b*: linear projection, 52: flange, 53: first spur-gear teeth, 54: first engaging portion, 60: hollow shaft, 60*a*: motor-shaft-receiving portion, 60*b*: boss-receiving portion, 61: second spur-gear teeth, 80: flange, 81: lifting stopper, 82: rib, 83: rotation stopper, 84: second engaging portion, 85: rotation-stopping projection, 90: key-shaft receiver, 91: key wall, 91*a*, 91*b*: upper stopper, 92: lower stopper, 100: air-conditioning-apparatus indoor unit

The invention claimed is:

1. A temperature-detecting device comprising:
a frame serving as an outer shell;
a temperature-detecting unit held inside the frame such that the temperature-detecting unit is rotatable;
a driving unit configured to drive the temperature-detecting unit to rotate;
a rotation-controlling unit configured to control rotation of the temperature-detecting unit; and
a controller configured to correct temperature detected by the temperature-detecting unit,
the temperature-detecting unit including
a sensor configured to detect temperature,
a sensor cap in which the sensor is held, and
a sensor case having an opening and by which the sensor cap is held such that the sensor cap is rotatable, the opening allowing the sensor to be exposed to an outside,
the rotation-controlling unit being configured
to allow the sensor cap to rotate synchronously with the sensor case within a range of 360-degree rotation of the temperature-detecting unit from a reference position, with the sensor being exposed at the opening of the sensor case, and
to stop rotation of the sensor cap when the temperature-detecting unit reaches a target angle that is over 360 degrees from the reference position, with the sensor case being kept rotated by the driving unit such that the sensor is displaced from the opening and is covered by the sensor case,
the controller being configured to correct a temperature detected while the sensor is exposed at the opening, the temperature being corrected with reference to a temperature detected while the sensor is covered by the sensor case.

2. The temperature-detecting device of claim 1,
wherein the driving unit is attached to the sensor case,
wherein the sensor cap is in engagement with the rotation-controlling unit such that the sensor cap is allowed to be disengaged from the rotation-controlling unit,
wherein the rotation-controlling unit is in engagement with the driving unit, and
wherein the sensor cap is configured to rotate synchronously with the sensor case with an aid of the rotation-controlling unit within the range of 360-degree rotation of the temperature-detecting unit from the reference position and to stop rotating by being disengaged from the rotation-controlling unit when the temperature-detecting unit reaches the target angle that is over 360 degrees from the reference position.

3. The temperature-detecting device of claim 2,
wherein the sensor cap has a slit, and
wherein the rotation-controlling unit has a rib that is in engagement with the slit such that the rib is allowed to be disengaged from the slit.

4. The temperature-detecting device of claim 1,
wherein the rotation-controlling unit includes
a liftable ring configured to rotate together with the driving unit by being in engagement with the driving unit and to be lifted against the driving unit when the temperature-detecting unit reaches the target angle that is over 360 degrees from the reference position, and
a rotary key configured to control rotation of the lifted liftable ring.

5. The temperature-detecting device of claim 4,
wherein the driving unit includes a cylindrical body,
wherein the cylindrical body has a first engaging portion projecting inside and toward a center axis of the cylindrical body and that is inclined along a circumferential direction, and
wherein the liftable ring has a second engaging portion that is in engagement with the first engaging portion and the liftable ring is configured to rotate together with the driving unit in a state where the first engaging portion and the second engaging portion are in engagement with each other and to be lifted against the driving unit in a state where the second engaging portion moves along the first engaging portion.

6. An air-conditioning-apparatus indoor unit comprising:
a housing serving as an outer shell;
a fan housed in the housing and configured to suction air from an air-conditioned space into the housing through an air inlet and to discharge the air through an air outlet;
a heat exchanger housed in the housing and configured to cause refrigerant flowing inside the heat exchanger and the air suctioned into the housing to exchange heat with each other; and
the temperature-detecting device of claim 1.

* * * * *